UNITED STATES PATENT OFFICE.

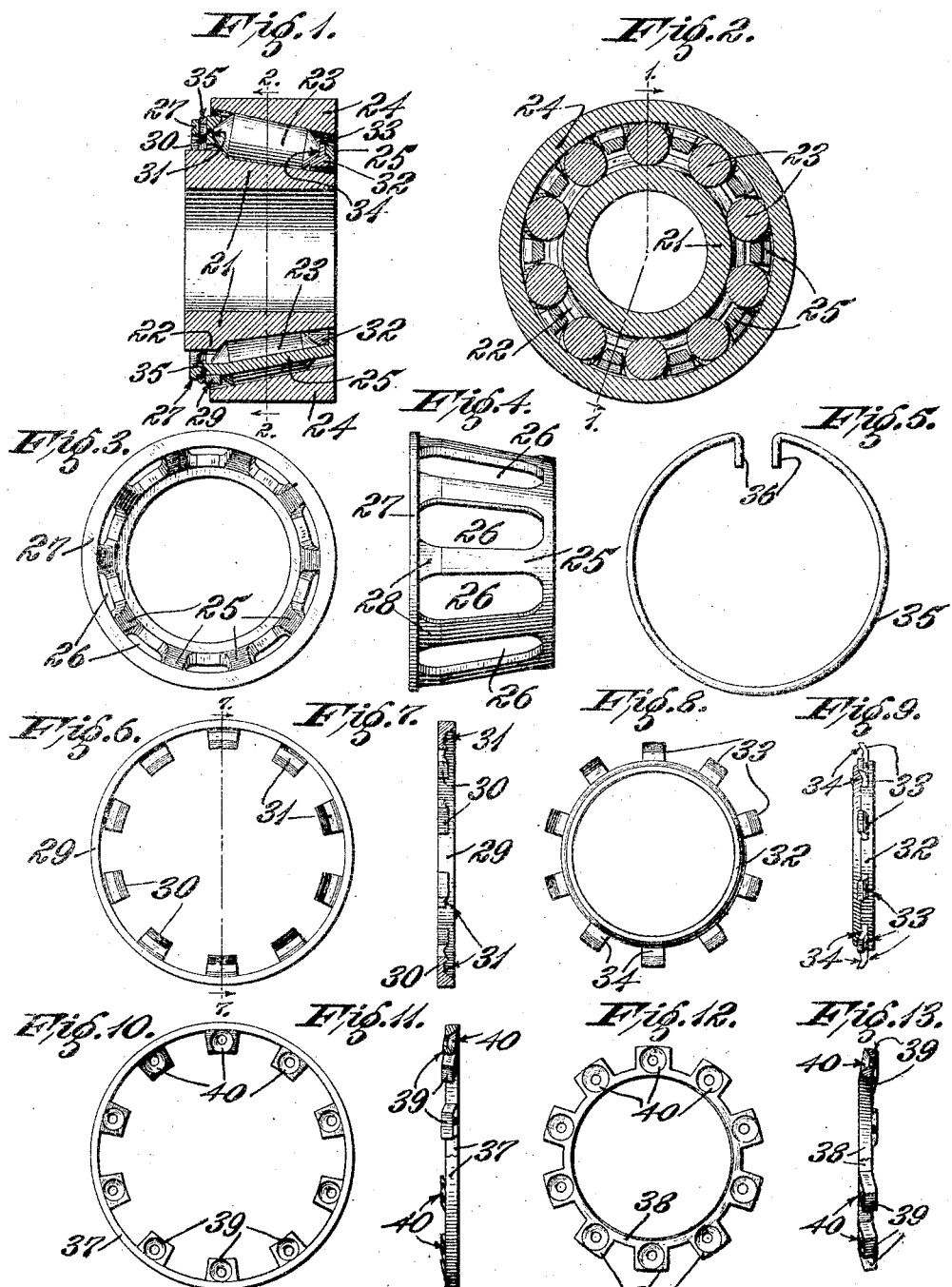
O. E. MICHAUD.
ROLLER BEARING.
APPLICATION FILED AUG. 16, 1913.
1,093,795.
Patented Apr. 21, 1914.

ONESIME E. MICHAUD, OF ST. LOUIS, MISSOURI.

ROLLER-BEARING.

1,093,795.  Specification of Letters Patent.  Patented Apr. 21, 1914.

Application filed August 16, 1913. Serial No. 785,042.

*To all whom it may concern:*

Be it known that I, ONESIME E. MICHAUD, a citizen of the United States, and a resident of the city of St. Louis and State of Missouri, have invented a new and useful Improvement in Roller-Bearings, of which the following is a specification.

This invention relates to roll carrying and spacing devices for conical roller bearings.

The object of the invention is an improved combined roll carrier and spacing device which can be readily assembled with the rolls and bearing ring, and which may be as readily disassembled, if need be.

The invention consists in a roll spacing cage which increases in diameter toward one end approximately in proportion to the increase in diameter of the tapered rolls, and which carries a roll retaining ring at each end interlocked therewith.

Further objects of the invention appear below in connection with the description of the embodiments thereof illustrated in the accompanying drawings, and in what the invention consists is particularly pointed out in the appended claims.

In the drawings, in which like characters refer to the same parts throughout the several views, Figure 1 is an axial sectional view of a roller bearing embodying my invention, on the line 1—1 in Fig. 2; Fig. 2 is a transverse sectional view of the same on the line 2—2 in Fig. 1; Fig. 3 is an end view of the spacing cage; Fig. 4 is a side view of the same; Fig. 5 is a broadside view of the split locking ring; Fig. 6 is a broadside view of the outer retaining ring; Fig. 7 is a sectional view of the same on the line 7—7 in Fig. 6; Fig. 8 is a broadside view of the inner retaining ring; Fig. 9 is a side elevation of the same on the line 9—9 in Fig. 8; Figs. 10 to 13, inclusive, are views similar to Figs. 6 to 9, inclusive, showing modified forms of retaining rings; and Fig. 14 is a part sectional view of a fragment of a spacing cage, showing a means for securing the ends of the split locking ring.

Refering to the drawings, the bearing shown in Figs. 1 and 2 comprises a conical inner race ring 21 having a shoulder or rib 22 around its larger end, tapered rolls 23 spaced circumferentially around said ring and adapted to roll thereon, with their axes intersecting the axis of the ring at a common point, and a cylindrical outer ring 24 having a conical inner raceway within which the rolls 23 have their bearing.

A spacing cage 25, having a tapering form corresponding to the inclination of the axes of the rolls, is arranged between the inner and outer roll raceways. This cage is formed with lengthwise openings 26 spaced around its periphery. These openings have walls which are parallel in the direction of their thickness and which conform in outline to the outline of the bearing portion of the rolls, whereby the rolls may be assembled therein by inserting them from either within or without the cage.

The larger end of the cage has an outer circumferential flange 27, and the outer periphery of the cage immediately adjacent thereto is cylindrical, forming a seat 28 for the larger retaining ring 29. The larger retaining ring 29 is slidable onto the seat 28 from the smaller end of the cage, but the inward projecting ears 30 prevent rotation thereof on the seat. These ears 30 project into the openings 26 in the cage and engage between the side walls thereof at the larger end of the cage. The ears are formed with circular grooves 31 on their faces toward the openings 26 to provide seats for the pointed ends of the rolls. A similar retaining ring 32 is arranged within the smaller end of the cage, with its ears 33 projecting outward into the openings 26 and fitting between the side walls thereof at their smaller ends. The ears of the smaller retaining ring have circular grooves 34 for seating the inner ends of the rolls. A split locking ring 35 is arranged around the seat 28 of the cage between the flange 27 and larger retaining ring 29 for preventing the endwise movement of the latter away from the ends of the rolls. The ends 36 of the locking ring are bent inward to engage between the side walls of one of the openings 26, the extremities of said ends being bent around to engage the inside of the cage, as shown in Fig. 14.

The retaining rings 37 and 38 shown in Figs. 10 to 13, inclusive, are like the rings 29 and 32, above described, except that the ears 39 are formed with countersunk holes 40 for the ends of the rolls instead of circular grooves. To assemble the rolls and cage, the retaining rings are first slipped the larger one over and the smaller one within the cage, and positioned with their ears projecting into the openings 26, and touching the ends thereof. The cage may be slipped over the inner bearing ring or within the outer bearing ring, and the rolls inserted in the openings either from the outside or from the inside, depending on whether the cage is outside or inside the bearing ring raceway. After the rolls are in place, the larger retaining ring 29 is adjusted lengthwise to secure the ends of the rolls between it and the smaller retaining ring 32, and the split locking ring 35 is snapped into the space left between the retaining ring 29 and the flange 27 of the cage. The ends of the locking ring are made fast, and the assembling operation is complete except for inserting or slipping on the remaining bearing ring.

It is evident from the above description that either the inner or outer bearing ring may be provided with flanges or shoulders at each end of its raceway, and thereby be retained in assembled relation to the rolls and spacing device. It is also evident that the forms and sizes of the several parts of the device shown in the drawings may be modified without departing from the invention, and I do not restrict the invention to the precise forms and sizes shown.

What I claim as my invention is as follows:

1. A retaining device for a conical roller bearing comprising a tapered roll cage having lengthwise pockets conforming to the taper of the rolls, said cage having a flange around its larger end, a retaining ring surrounding the larger end of said cage spaced inside said flange, and having inward projecting portions seated in the adjacent ends of said pockets, said inward projecting portions being provided with seats for the ends of the rolls, and a locking ring in the space between said retaining ring and flange.

2. A retaining device for a conical roller bearing comprising a tapered roll cage having lengthwise pockets conforming to the taper of the rolls, said cage having a flange around its larger end, a retaining ring surrounding the larger end of said cage spaced inside said flange, and having inward projecting portions seated in the adjacent ends of said pockets, said inward projecting portions being provided with seats for the ends of the rolls, a second retaining ring arranged within said cage at its smaller end and having outward project portions seated in the adjacent ends of said pockets, said outward projecting portions being provided with seats for the ends of the rolls, and a locking ring in the space between said retaining ring and flange.

3. A retaining device for a roller bearing comprising a skeleton roll cage having an out-turned peripheral flange at one end and an inturned peripheral flange at its other end and lengthwise portions parallel to the axes of the rolls connecting said flanges and forming spaced roll pockets between them, a retaining ring having ears formed with seats for the ends of the rolls arranged on said cage near one end thereof, with said ears projecting into said roll pockets, and a removable locking ring between said retaining ring and the adjacent flange of said cage.

4. A retaining device for roller bearing comprising a skeleton roll cage having an out-turned peripheral flange at one end and an inturned peripheral flange at its other end and lengthwise portions parallel to the axes of the rolls connecting said flanges and forming spaced roll pockets between them, retaining rings having ears formed with seats for the ends of the rolls arranged on said cage near the ends thereof, with said ears projecting into said roll pockets, and a removable locking ring between one of said retaining rings and the adjacent flange of said cage.

Signed at St. Louis, Mo., this 11th day of August, 1913.

ONESIME E. MICHAUD.

Witnesses:
AMARA M. HOLCOMBE,
ANDREW P. KESSLING.